INVENTORS
Bernard KAHANE
Ronald H. STEWART

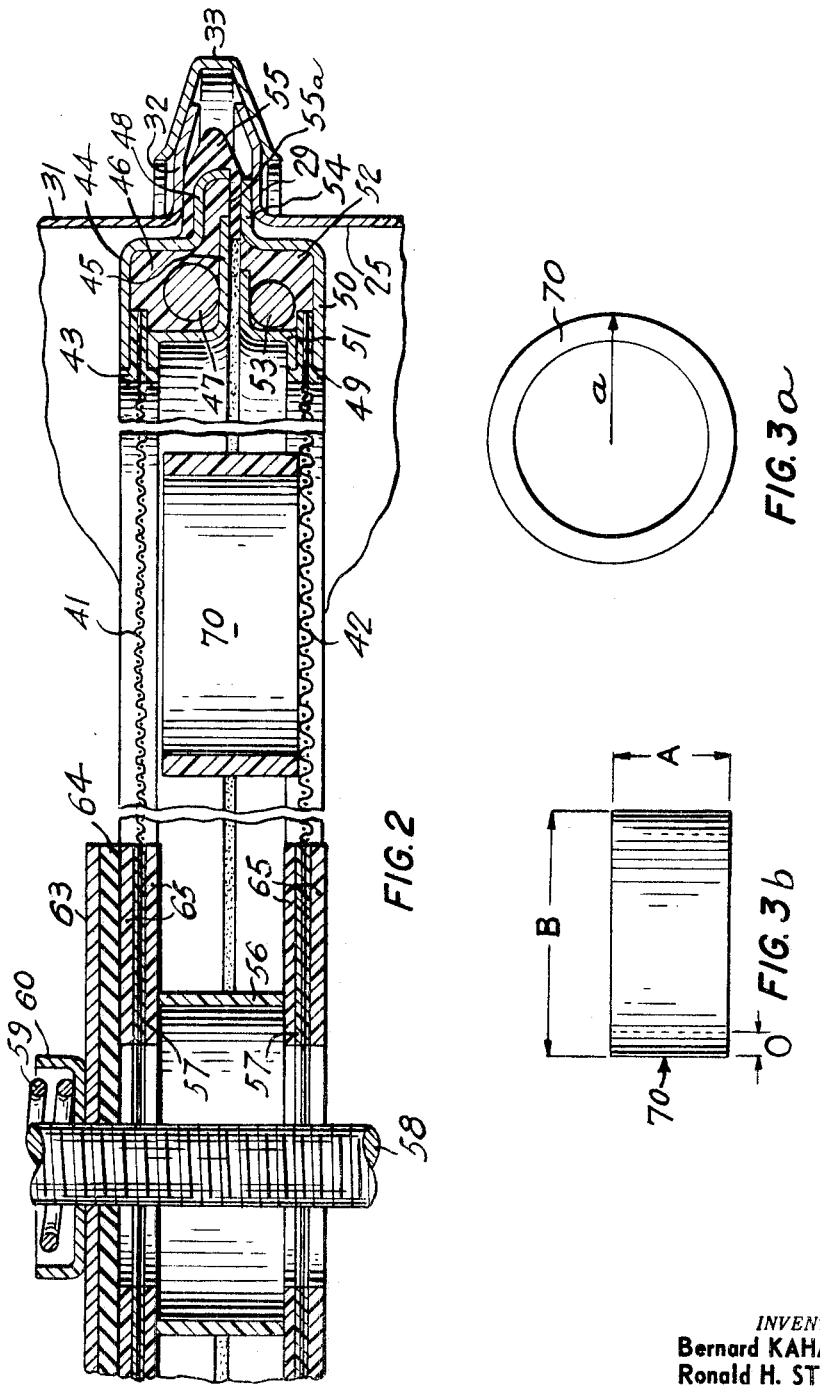

United States Patent Office

3,508,649
Patented Apr. 28, 1970

3,508,649
ANTI-BLINDING DEVICE FOR VIBRATORY SEPARATOR
Bernard Kahane, Baie d'Urfe, Quebec, and Ronald Hugh Stewart, Montreal, Quebec, Canada, assignors to Separator Engineering Ltd., Montreal, Quebec, Canada
Filed Aug. 4, 1967, Ser. No. 658,469
Int. Cl. B07b 1/48, 1/52
U.S. Cl. 209—323    3 Claims

ABSTRACT OF THE DISCLOSURE

A vibratory screen separator including a horizontal separator screen, a horizontal support screen having apertures at least as large as those of the separator screen, and means for mounting the screens in vertically spaced parallel relationship with the separator screen above the support screen. A plurality of anti-blinding rings having substantially flat parallel upper and lower end surfaces are disposed between the screens and extend at least over the major part of the distance between the springs. Means are provided for imparting a relatively large horizontal component in addition to a vertical component to the rings to scrape and dislodge the material from the underside of the screen's wires.

FIELD OF THE INVENTION

The present invention relates to vibratory separators and more particularly to vibratory separators having anti-blinding devices. The invention is more particularly, but not exclusively, directed to vibratory separators of the class in which a gyratory and oscillatory tilting motion is imparted to the screen and the casing to which it is attached by means of a motor mounted at the shaft and provided with eccentric weights on its shaft. "Blinding" is the name attributed in the art to the phenomenon according to which part of the material which is being screened lodges in the aperture of the screen, blocking or blinding part of the area of the screen and so reducing the speed and efficiency of separation.

DESCRIPTION OF THE PRIOR ART

A large number of solutions has been proposed for dealing with this problem. In general, the solutions involve locations on the top surface of the screen of balls or other elements of various shapes which bounce as the screen is vibrated and strike the screen repeatedly so as to shake loose material which has become lodged.

It has also been proposed to locate such elements in a subsidiary or supporting screen located below the main separator screen so as to be vibrated with the separator screen. In this location, the elements move at random in the gap between the support and separator screens and strike the underside of the separator screen so as to dislodge trapped material either by direct impact or by the secondary vibration which the impacts induce in the screen material.

Neither of the solutions described above has proved effective in freeing fibrous material or sticky material from the screen apertures in which it has become trapped. Soft fibres are simply bent around the screen wire by the impact. Sticky materials, such as resins contained in natural woods, cling to the screen wire and are compacted by the impacts rather than dislodged.

SUMMARY OF THE INVENTION

It is therefore an object of the present invention to provide in a vibratory separator an improved anti-blinding means, and in particular, anti-blinding means which is effective to eliminate or substantially reduce blinding caused by blockage of the screen apertures by soft fibres and sticky materials.

In accordance with one aspect of the present invention there is provided a vibratory separator comprising:

A horizontal separator screen,

A horizontal support screen having apertures at least as large as those of the separator screen, Means mounting said screens in vertically spaced parallel relationship, with said separator screen above said support screen, Means for imparting vibration having a horizontal and vertical component to said screens together, so as to effect separation of material fed on to said separator screen, and A plurality of anti-blinding rings having substantially flat parallel upper and lower end surfaces disposed between said screens so as to be supported by said support screen, said rings each having an outer diameter at least as large as its axial height and extending in height over at least the major part of the distance between the screens but less than the total distance.

The height of each ring is preferably less than the distance between the screens by an amount from about $\frac{1}{16}$ to about $\frac{1}{4}$ of an inch, and in the preferred embodiment the optimum amount is approximately $\frac{1}{8}$ of an inch. The rings are preferably cylindrical and may be composed of a substantially rigid synthetic resin material. It is preferred to pack substantially or at least nearly the whole of the horizontal area between the support screens with the anti-blinding rings.

It has been found that the present invention, while effective in reducing blinding caused by granular particles, is especially effective in preventing the blinding caused by fibrous materials and sticky materials. In the preferred form of the invention the hollow rings are given a controlled motion which has a relatively large horizontal component in addition to a vertical component. The square edges formed between the peripheral cylindrical walls and the substantially flat end surfaces of the rings strike the underside of the screen which has to be cleaned and the horizontal movement causes them to shear off the ends of the fibres lodged in the screen openings and to scrape sticky materials from the underside of the screen wires. The vertical movement results in enough impact against the screen to loosen granular particles and dislodge the remaining upper portion of the fibrous materials whose lower portions have been sheared off by the horizontal motion of the rings.

BRIEF DESCRIPTION OF THE DRAWINGS

For a better understanding of the invention and to show how it may be carried into effect, reference will now be made to a preferred embodiment described and illustrated with reference to the accompanying drawings in which:

FIG. 2 is a vertical cross-section on an enlarged scale of part of the screen and anti-blinding device of the separator of FIG. 1, and FIGS. 3a and 3b are a top plan view and elevation of a preferred form of anti-blinding ring.

DESCRIPTION OF THE PREFERRED EMBODIMENT

Figure 1:
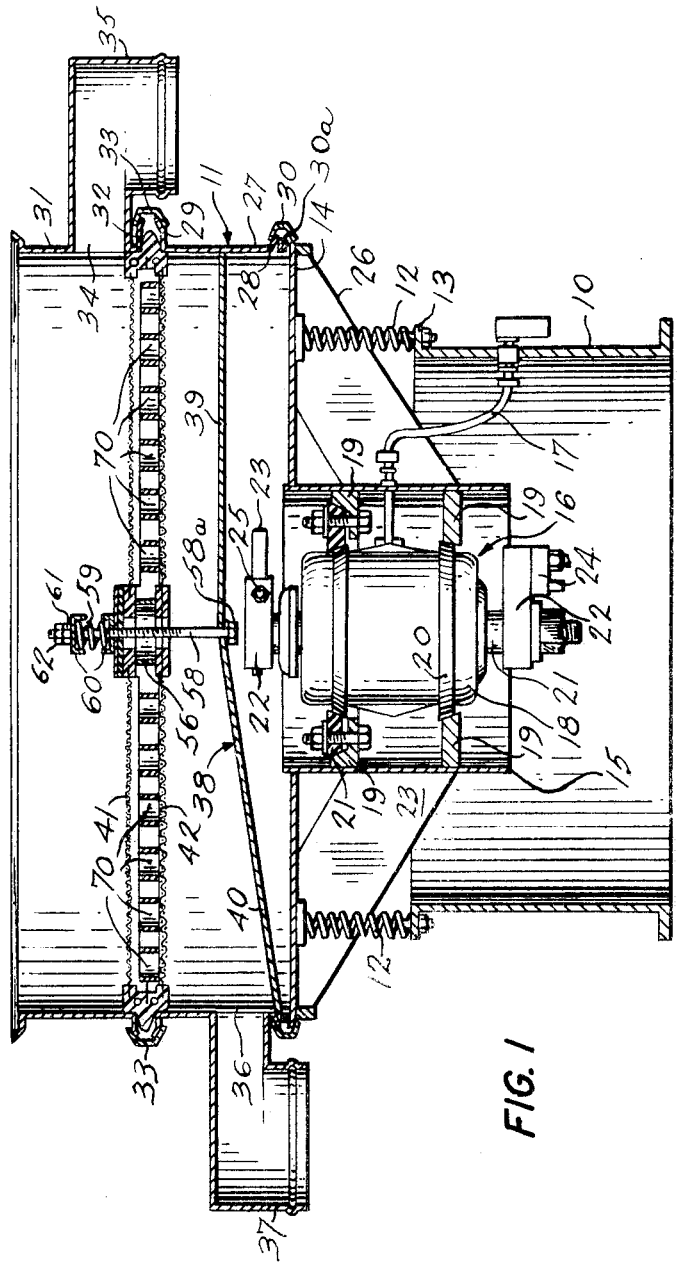
FIG. 1 is a vertical cross-section through a vibratory separator in accordance with the invention.

The separator illustrated in FIG. 1 includes a stationary cylindrical base 10 and a separator frame 11, the frame 11 being mounted on the base 10 by means of a plurality of springs 12 which permit the frame 11 to "float." The springs 12 extend between an upper peripheral flange 13 of the base 10 and the bottom 14 of the frame 11. The bottom 14 is secured so as to be rigid with a motor enclosure 15. An electric motor 16 is mounted to the enclosure by way of mounting rings 20 which encircle the motor 16. The lower rings 20 are seated in sloping end surfaces of lower brackets 19 projecting inwardly from the enclosure wall and the upper rings 20 are clamped by clamp elements 21 to upper brackets 19. Mounting arms 22 extend from the motor shaft 21 at the upper and lower ends thereof, and eccentric weights 23, 24 are mounted to the upper and lower arms 22 respectively in any desired manner so as to be adjustable in lead and magnitude. As shown, the upper weight 23 is extensible from the upper arm 22 which is hollow, being clamped in place by bolt 25 and the lower weight 24 is bolted to the lower arm 22, the assembly of arm and weight being rotatable about the motor axle for adjustment.

Webs 26 interconnect the bottom 14 with the motor enclosure 15 to impart additional rigidity to the structure. It will be apparent that due to the resilient mounting of the motor enclosure and frame 11, which are themselves rigid one with the other, the eccentric weights cause a gyratory and oscillatory tilting motion of the whole of the frame 11 and anything supported by the frame.

The frame 11 includes a lower cylindrical wall 27 having a lower peripheral flange 28 and an upper peripheral flange 29. The lower peripheral flange 28 is downwardly curved at the rim, to correspond with an upward turn of the rim of the bottom 14, and these rims are connected by a clamping ring 30 with a filler ring 30a in between.

Resting upon the lower cylindrical wall 27 is an upper cylindrical wall 31 having a lower rim 32, the rims 29 and 32 of equal radial extension and being bent towards each other so as to facilitate their interconnection and clamping by a second clamping ring 33.

The upper wall 31 has a peripheral outlet 34 surrounded by a downwardly directed spout 35, the purpose of which will become evident. The lower peripheral wall 27 also has an outlet 36, which may be arranged as shown diametrically opposed to the outlet 34, and to which is attached a spout 37.

A deflector plate 38 is located within the wall 27 and is mounted thereto at its periphery for example by welding. The deflector plate 38 is bent about a diameter running at right angles to a line interconnecting the center lines of the outlets 34, 36, so as to have a horizontal half 39 and a downwardly sloping half 40, which leads to a point on the peripheral wall 27 below the outlet 36 in order to direct material falling from the deflector plate 38 to the outlet 36.

A separator screen 41 and a support screen 42 are mounted by their peripheral rims at the junction of the frame walls 27, 31 as will be more apparent from FIG. 2.

The rim of separator screen 41 is held between resilient gaskets 43 composed for example of rubber or neoprene, upper and lower surfaces of which are clamped between the inner ends of metal for example stainless steel tension rings 44, 45. The tension rings 44, 45 are bent to enclose a space 46 which is filled with epoxy resin. Embedded in the epoxy resin is a reinforcing ring 47 of, for example, ¼ inch mild steel. The outer rim of the tension ring 44 is bent outwardly and downwardly in the form of a flange 48.

The lower, support screen 42 also has its rim held between resilient gaskets 49, upper and lower surfaces of which are gripped between metal tension rings 50, 51. The tension rings 50, 51 are also bent so as to form an enclosed space 52, which is again filled with epoxy resin embedded in which is a similar but thinner reinforcing ring 53. The lower tension ring 50 is upwardly bent at its rim to form a flange 54. A generally U sectioned gasket 55 of resilient material such as rubber encloses the rim formed by flange 48 and the end of lower gasket ring 45, with its lower limb 55a separating flange 45 from flange 54 of tension ring 51 so as to form a resilient cushion between the screen mountings. The upper surface of the U sectioned gasket 55 and the lower surface of the end portion of tension ring 51 are sandwiched between the flanges 29 and 32 of the peripheral walls 27, 31 of the casing 11.

The mounting above described for the separator and support screens provides a rigid spacing for the screens at the periphery and at the same time a convenient mounting arrangement for the screens within casing 11.

The apertures of the support screen 42 should be at least as large and preferably considerably larger than the apertures of the separator screen 41, in order to allow material which has passed through the separator screen 41 through to the deflector plate 38 without hinderance.

The parallel spacing between the screen 41, 42 is maintained at the center by means of a spacer ring 56. The screens have central apertures and the rim portions adjoining the apertures are embedded in further epoxy resin retaining elements 57, the inner surfaces of which are separated by a spacing ring 56. A tie bolt 58 is passed through a central aperture in the deflector plate 38, and its head 58a is welded against the lower surface of the deflector plate 38, and it passes through the central apertures in the screens. A compression spring 59, seated between cupped-shaped washers 60 is threaded over the upper end of the bolt 58.

The lower cupped-shaped washer 60 rests upon a metal plate 63 which in turn rests upon a gasket 64 of elastomeric material. Washers 65 of resilient plastic material are bonded on each side of the epoxy rim retainers of the screens, the inner washers 65 abutting the spacing ring 56, which is preferably of the same material as the anti-binding rings to be described. The spring 59 is held in compression by a nut 61, so that the screens are resiliently tied down with fixed spacing to the deflector plate 38. A lock nut 62 is provided to prevent dislodgement of the adjusting nut 61.

Located between the support screen 42 and the separator screen 41 and resting on the support screen are a plurality of anti-blinding rings 70. As shown more particularly in FIGS. 3a and 3b these rings are of cylindrical construction having walls of substantial thickness, although the thickness is small compared with the diameter of the rings, so that passage of finer fraction of screened material is unimpeded by the rings. The rings have substantially flat parallel end surfaces so that the corners between the end surfaces and the peripheral walls are substantially sharp right angles. Substantially sharp corners are preferred in the present invention, to facilitate the shearing action of the rings but it has been found that the corners get worn down in the passage of time without greatly affecting the performance. The rings are preferably constructed of a substantially rigid synthetic resin material, and suitable materials include acrylic resins, for example as sold under the registered trademark "Lucite." To provide the necessary stability for the rings, the outer diameter marked B in FIG. 3b should be at least as great and preferably substantially greater than the height A of the rings. The rings extend in height over at least a major portion of the distance between the screens. In the preferred embodiment the distance between the screens is, for example, 15/16 of an inch and the gap between the upper end of the rings and the upper screen is ⅛ of an inch. In more general terms, it may be said that this gap should preferably lie between about 1/16 and ¼ of an inch.

It is preferred to employ sufficient rings to fill nearly or substantially all of the horizontal area of the support screen 42, which in the embodiment shown is equal in area to the separator screen 41. This ensures that the rings move together with a circular motion and cover the entire area of the lower surface of the separator screen 41 as rapidly as possible.

The eccentric weights on the motor 16 impart a vibration to the unit consisting of the screens, the motor enclosure 15 and the frame 11, which has gyratory and oscillatory tilting components. This causes the material on the upper screen to be given a series of upward and spiral impulses which move the material remaining on the upper screen toward and around the wall 31 until it reaches the outlet 34. Similarly material which passes through the screens and rings falls on to the deflecting plate 38 where it moves around to the outlet 36. It will be apparent that this type of motion imparts circulatory and upward movement of the anti-blinding rings 70 ensuring their proper performance, but other types of motion may be used which would give the necessary movement to the anti-blinding rings. It is only necessary that the vibration should have vertical and horizontal components of motion to move the rings up to and across the lower surface of the upper screen to carry out their shearing action.

While the cylindrical construction of the rings shown is preferred in the present invention, other types of rings may be used with a certain measure of success. For example, it would not be a departure from the present invention to make use of polygonal rings, or rings having vertically arcuate peripheral surfaces. However, in such cases it would not be possible to pack so many rings to fill the necessary area.

What is claimed is:
1. A vibratory separator having a casing comprising:
   a horizontal separator screen,
   a support screen parallel and below said separator screen and having apertures greater than that of said separator screen,
   a plurality of anti-blinding rings having substantially flat upper and lower end surfaces disposed between said screens so as to be supported by said separator screen,
   a resilient support means for holding said separator screen at its periphery and a resilient support means for holding said support screen at its periphery, support means for supporting both of said resilient support means and said separator screen and said support screen to said casing, said support means including first tensioning means for applying a tension to said resilient support means for said separator screen and said support screen and resilient means interposed between said tensioning means and said casing,
   said first tensioning means including two pairs of tensioning rings, one pair of tensioning rings supporting said resilient support means for said separator screen and the other pair of tensioning rings supporting said resilient support means for said support screen wherein each of said pairs of tensioning rings defines an annular space, a plastic filling each of said annular spaces, and a reinforcing ring located in each of said plastic filled annular spaces,
   means including spacing means between said separator screen and said support screen and located in the intermediate section of each of said screens for holding said screens parallel to each other and second tensioning means for urging said separator screen towards said support screen and for allowing said intermediate sections of said separator screen and said support screen to move relative to said casing as the separator is vibrated, and
   an annular resilient gripping means adjacent said spacing means for gripping said support screen and said separator screen and said second tensioning means acting against said gripping means for said separator screen.

2. A separator according to claim 1 wherein said annular resilient gripping means for said separator screen and said support screen includes a pair of resilient gaskets, one of said resilient gaskets gripping said separator screen and the other of said resilient gaskets gripping said support screen and said second tensioning means urging said resilient gasket for said separator screen in contact with said spacing means and said spacing means in contact with said resilient gasket for said support screen.

3. A separator according to claim 1 wherein said spacing means is defined by a hollow cylindrical member.

References Cited
UNITED STATES PATENTS

| | | | |
|---|---|---|---|
| 961,414 | 6/1910 | Kinsey | 209—387 |
| 979,685 | 12/1910 | Mumford | 209—385 X |
| 1,572,112 | 2/1926 | Forgeson | 209—323 |
| 2,696,302 | 12/1954 | Miller | 209—332 |
| 3,035,700 | 5/1962 | McCausland | 209—405 |
| 3,366,239 | 1/1968 | Swallow | 209—382 X |
| 2,676,706 | 4/1954 | Temple | 209—332 X |
| 3,029,946 | 4/1962 | Wright | 209—405 |
| 3,243,042 | 3/1966 | Moulton | 209—403 |
| 3,341,013 | 9/1967 | Moulton | 209—405 X |

HARRY B. THORTON, Primary Examiner

R. HALPER, Assistant Examiner

U.S. Cl. X.R.
209—385, 403

UNITED STATES PATENT OFFICE
CERTIFICATE OF CORRECTION

Patent No. 3,508,649            Dated April 28, 1970

Inventor(s) Bernard Kahane et al.

It is certified that error appears in the above-identified patent and that said Letters Patent are hereby corrected as shown below:

Column 1, line 21, "springs" should read -- screens --.
Column 5, line 32, "separator" should read -- support --.

Signed and sealed this 27th day of April 1971.

(SEAL)
Attest:

EDWARD M. FLETCHER, JR.          WILLIAM E. SHCUYLER, JR.
Attesting Officer                Commissioner of Patents